United States Patent
Yoon et al.

(10) Patent No.: US 11,949,066 B2
(45) Date of Patent: Apr. 2, 2024

(54) SOLID ION CONDUCTOR, SOLID ELECTROLYTE AND ELECTROCHEMICAL DEVICE INCLUDING THE SAME, AND METHOD OF PREPARING SOLID ION CONDUCTOR

(71) Applicant: Samsung Electronics Co., Ltd., Suwon-si (KR)

(72) Inventors: Gabin Yoon, Yongin-si (KR); Wonsung Choi, Hwaseong-si (KR); Jusik Kim, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 204 days.

(21) Appl. No.: 17/341,458

(22) Filed: Jun. 8, 2021

(65) Prior Publication Data
US 2022/0149426 A1 May 12, 2022

(30) Foreign Application Priority Data
Nov. 9, 2020 (KR) .................. 10-2020-0148585

(51) Int. Cl.
H01M 10/0562 (2010.01)
H01M 4/13 (2010.01)
H01M 4/62 (2006.01)
H01M 10/0525 (2010.01)

(52) U.S. Cl.
CPC ......... *H01M 10/0562* (2013.01); *H01M 4/13* (2013.01); *H01M 4/628* (2013.01); *H01M 10/0525* (2013.01); *H01M 2300/008* (2013.01)

(58) Field of Classification Search
CPC .... H01M 10/0562; H01M 4/13; H01M 4/628; H01M 10/0525; H01M 2300/008
See application file for complete search history.

(56) References Cited

U.S. PATENT DOCUMENTS

| | | | |
|---|---|---|---|
| 8,709,678 B2 | 4/2014 | Seo et al. | |
| 9,453,161 B2 | 9/2016 | Zhuravleva et al. | |
| 9,543,564 B2 | 1/2017 | Fasching et al. | |
| 10,930,927 B2 | 2/2021 | Miara et al. | |
| 2019/0088995 A1 | 3/2019 | Asano et al. | |
| 2020/0075993 A1 | 3/2020 | Ling et al. | |
| 2020/0212478 A1* | 7/2020 | Sakai | H01M 10/052 |
| 2020/0328457 A1 | 10/2020 | Sakai et al. | |
| 2021/0376378 A1 | 12/2021 | Jung et al. | |
| 2022/0006116 A1 | 1/2022 | Choi et al. | |
| 2022/0149430 A1 | 5/2022 | Choi et al. | |
| 2022/0255125 A1* | 8/2022 | Suzuki | H01B 1/06 |

FOREIGN PATENT DOCUMENTS

| | | | |
|---|---|---|---|
| CN | 102286286 B | | 4/2016 |
| CN | 110137561 A | | 8/2019 |
| CN | 111295789 A | | 6/2020 |
| CN | 111900462 A | * | 11/2020 |
| KR | 1020110107187 A | | 9/2011 |
| KR | 1020190053111 A | | 5/2019 |

OTHER PUBLICATIONS

Li et al. (Energy Environ. Sci., 2020, 13, 1429) (Year: 2020).*
Duan et al. (CN111900462(A) and using Machine Translation as English version) (Year: 2020).*
Bohnsack et al., "Ternare Chloride der Selten-Erd-Elemente mit Lithium, Li3MCI6 (M=Tb-Lu, Y, Sc): Synthese, Kristallstrukturen und Ionenbewegung", Z. anorg. allg. Chem., 623, 1997, 1067-1073 Concise Explanation of Relevance: See TABELLE 1,2,3 and 5, and ABB. 1,2,3,4 and 5.
Orthorhombic Space Groups—ttppd.chem.ucl.ac.ukpdnnsymm3sgortho.htm.

* cited by examiner

Primary Examiner — Milton I Cano
Assistant Examiner — Joshua P McClure
(74) Attorney, Agent, or Firm — CANTOR COLBURN LLP

(57) ABSTRACT

A solid ion conductor comprising a compound represented by Formula 1 having an orthorhombic crystal structure, and belonging to a Pnma space group or a Pnma-like space group:

$$Li_{3-x}A_xLuCl_{6-y}X_y \qquad \text{Formula 1}$$

wherein, in Formula 1, A is a monovalent cation having an ionic radius of 76 picometers or greater, X is a monovalent anion, and $0 \leq x \leq 0.1$, $0 \leq y \leq 1$, and $x+y>0$.

26 Claims, 6 Drawing Sheets

SOLID ION CONDUCTOR, SOLID ELECTROLYTE AND ELECTROCHEMICAL DEVICE INCLUDING THE SAME, AND METHOD OF PREPARING SOLID ION CONDUCTOR

CROSS-REFERENCE TO RELATED APPLICATION

This application claims priority to Korean Patent Application No. 10-2020-0148585, filed on Nov. 9, 2020, in the Korean Intellectual Property Office, and all the benefits accruing therefrom under 35 U.S.C. § 119, the disclosure of which in its entirety is incorporated herein by reference herein.

BACKGROUND

1. Field

The present disclosure relates to a solid ion conductor, a solid electrolyte including the solid ion conductor, an electrochemical device including the solid electrolyte including the solid ion conductor, and a method of preparing the solid ion conductor.

2. Description of the Related Art

An electrochemical device such as an all-solid secondary battery, includes lithium metal as a negative electrode to provide high energy density and a solid ion conductor as an electrolyte.

The solid ion conductor may be an oxide-based solid ion conductor or a sulfide-based solid ion conductor. The use of an oxide-based solid ion conductor involves an additional process step to provide good interfacial adhesion between the oxide-based solid ion conductor and a negative electrode and/or between the oxide-based solid ion conductor and a positive electrode. During this additional process step, side reactions between the oxide-based solid ion conductor and the positive electrode active material and/or between the oxide-based solid ion conductor and the negative electrode active material may occur at the interface, thereby impeding lithium ion migration. A sulfide-based solid ion conductor may react with the negative electrode active material and/or with the positive electrode active material, resulting in decomposition at the interface.

There thus remains a need for a solid ion conductor having improved ionic conductivity and low interfacial resistance, as well as a solid electrolyte and an electrochemical device that include the solid ion conductor.

SUMMARY

Provided is a solid ion conductor having improved ionic conductivity and low interfacial resistance.

Provided is a solid electrolyte including the solid ion conductor.

Provided is an electrochemical device including the solid electrolyte including the solid ion conductor.

Provided is a method of preparing the solid ion conductor.

Additional aspects will be set forth in part in the description which follows and, in part, will be apparent from the description, or may be learned by practice of the presented aspects of the disclosure.

According to an aspect, provided is a solid ion conductor including a compound represented by Formula 1 having an orthorhombic crystal structure and belonging to a Pnma space group or a Pnma-like space group:

$$Li_{3-x}A_xLuCl_{6-y}X_y \qquad \text{Formula 1}$$

wherein, in Formula 1,

A may be a monovalent cation having an ionic radius of 76 pm or greater,

X may be a monovalent anion, and $0 \leq x \leq 0.1$, $0 \leq y \leq 1$, and $x+y>0$.

In Formula 1, A may be $Na^+$, $K^+$, $Rb^+$, $Cs^+$, $Ag^+$, $Au^+$, $Cu^+$, $Hg^+$, $Tl^+$, or a combination thereof.

In Formula 1, X may be $Br^-$, $I^-$, or a combination thereof.

The compound may be $Li_{2.95}Na_{0.05}LuCl_6$, $Li_{2.95}K_{0.05}LuCl_6$, $Li_{2.95}Rb_{0.05}LuCl_6$, $Li_{2.95}Cs_{0.05}LuCl_6$, $Li_{2.95}Ag_{0.05}LuCl_6$, $Li_{2.95}Au_{0.05}LuCl_6$, $Li_{2.95}Cu_{0.05}LuCl_6$, $Li_{2.95}Hg_{0.05}LuCl_6$, $Li_{2.95}Tl_{0.05}LuCl_6$, $Li_3LuCl_5Br$, $Li_3LuCl_5I$, $Li_{2.95}Na_{0.05}LuCl_5Br$, $Li_{2.95}K_{0.05}LuCl_5Br$, $Li_{2.95}Rb_{0.05}LuCl_5Br$, $Li_{2.95}Cs_{0.05}LuCl_5Br$, $Li_{2.95}Ag_{0.05}LuCl_5Br$, $Li_{2.95}Au_{0.05}LuCl_5Br$, $Li_{2.95}Cu_{0.05}LuCl_5Br$, $Li_{2.95}Hg_{0.05}LuCl_5Br$, $Li_{2.95}Tl_{0.05}LuCl_5Br$, $Li_{2.95}Na_{0.05}LuCl_5I$, $Li_{2.95}K_{0.05}LuCl_5I$, $Li_{2.95}Rb_{0.05}LuCl_5I$, $Li_{2.95}Cs_{0.05}LuCl_5I$, $Li_{2.95}Ag_{0.05}LuCl_5I$, $Li_{2.95}Au_{0.05}LuCl_5I$, $Li_{2.95}Cu_{0.05}LuCl_5I$, $Li_{2.95}Hg_{0.05}LuCl_5I$, $Li_{2.95}Tl_{0.05}LuCl_5I$, or a combination thereof.

A space group of the compound may have a glide plane perpendicular to the x-axis, a mirror plane perpendicular to the y-axis, or a glide plane perpendicular to the z-axis.

The compound may have a centrosymmetric structure having a unit cell including: a first length extending in an x-axis direction, a second length extending in a y-axis direction, and a third length extending in a z-axis direction, and eight inversion points, wherein the x-axis direction, the y-axis direction, and the z-axis direction are perpendicular to one another, and the first length, the second length, and the third length are different from each other.

The compound may have a unit cell including four $2_1$ screw axes in each unit cell direction, and two planes in a direction perpendicular to each unit cell axis.

In the crystal structure of the compound, $LuCl_6$ or $LiX_6$ octahedrons may be positioned in an edge-sharing manner, wherein X=Cl or Br, and the A cation may be positioned at a Li site.

The compound may have a three-dimensional network of lithium ion transport channels within the crystal structure.

The compound may include a network of lithium ion transport channels, which extend in an x-axis direction, a y-axis direction, and a z-axis direction, and a spatial distribution of the lithium ion transport channels in the compound may be determined by an ionic radius of the monovalent cation A or the monovalent anion X in the crystal structure.

The compound may have an X-ray diffraction spectrum including X-ray diffraction peaks at 29°2θ to 32°2θ, 33°2θ to 35°2θ, and 34°2θ to 37°2θ, when analyzed with CuKα radiation.

The diffraction peaks of the compound may be shifted to a smaller diffraction angle relative to diffraction peaks of $Li_3LuCl_6$.

The solid ion conductor may have an ionic conductivity of about $1 \times 10^{-1}$ mS/cm (milliSiemens per centimeter) to about $5 \times 10^{-1}$ mS/cm, when measured at 25° C.

The solid ion conductor may have an interfacial resistance of about 25 ohm square centimeters to about 500 ohm square centimeters ($\Omega \cdot cm^2$) or less when contacted with lithium metal, when determined from an impedance spectrum of a lithium symmetric cell, in which the solid ion conductor is disposed between lithium metal electrodes, at 25° C. and a frequency range of 1 Hz to $1 \times 10^6$ Hz.

According to another aspect, a solid electrolyte includes the above-described solid ion conductor.

Also disclosed is protected positive electrode including: a positive electrode layer; and a protective layer comprising the solid ion conductor of claim 1 on the positive electrode layer.

Also disclosed is protected negative electrode including: a negative electrode layer; and a protective layer comprising the solid ion conductor of claim 1 on the negative electrode layer.

According to still another aspect, an electrochemical device includes: a positive electrode layer; a negative electrode layer; and a solid electrolyte layer between the positive electrode layer and the negative electrode layer, wherein the solid electrolyte comprises the solid ion conductor.

The solid ion conductor may be included in the solid electrolyte layer, the positive electrode layer, the negative electrode layer, or a combination thereof.

The solid electrolyte may have a thickness of about 10 micrometers (μm) to about 1 millimeter (mm) and may have a single layer structure or a multilayer structure.

The electrochemical device may be an all-solid secondary battery or a metal-air battery.

According to still another aspect, provided is a method of preparing an electrochemical device, the method comprising:
providing a precursor mixture; and
mechanically milling the precursor mixture to prepare the solid ion conductor,
wherein the solid ion conductor includes a compound represented by Formula 1 having an orthorhombic crystal structure, and belonging to a Pnma space group or a Pnma-like space group:

   Formula 1 wherein, in Formula 1,
A may be a monovalent cation having an ionic radius of 76 pm or more,
X may be a monovalent anion, and
$0 \leq x \leq 0.1$, $0 \leq y \leq 1$, and $x+y>0$.

BRIEF DESCRIPTION OF THE DRAWINGS

The above and other aspects, features, and advantages of certain aspects of the disclosure will be more apparent from the following description taken in conjunction with the accompanying drawings, in which.

DETAILED DESCRIPTION

Figure 1:
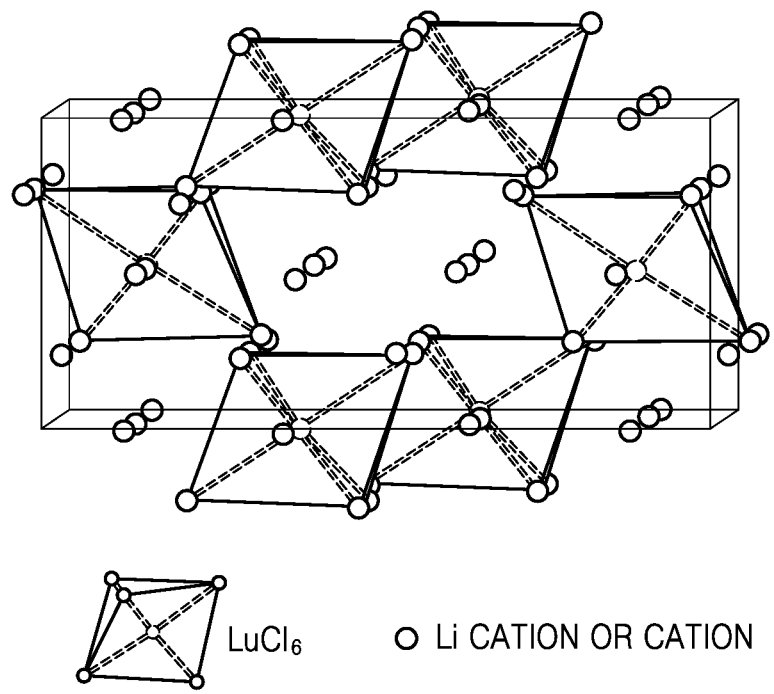
FIG. 1 is a schematic view showing an aspect of a crystal structure of a solid ion conductor compound.

Reference will now be made in detail to aspects, examples of which are illustrated in the accompanying drawings, wherein like reference numerals refer to like elements throughout. In this regard, the present aspects may have different forms and should not be construed as being limited to the descriptions set forth herein. Accordingly, the aspects are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list.

Hereinafter, a solid ion conductor according to aspects of the present disclosure, a solid electrolyte and an electrochemical device that include the same, and a method of preparing the solid ion conductor, according to aspects of the present disclosure, will be described in detail with reference to the appended drawings. The following description of various aspects of the present disclosure is provided for illustrative purpose only and not for limiting, and the present invention is only defined by the scope of the claims to be described later.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The expression "at least one" or "one or more" as used herein when preceding a list of elements modifies the entire list of elements and does not modify the individual elements of the list. The term "combination" as used herein includes a mixture, an alloy, or a reaction product, unless otherwise specified.

As used herein, the terms "comprises", "comprising," "includes," "including," "contains," or "containing" in relation to an element does not preclude other components but may further include another element, unless otherwise specified.

The terms "first," "second," or the like as used herein do not indicate order, quantity or importance, and are used to distinguish one element from another. Unless otherwise indicated herein or unless the context clearly indicates otherwise, it is construed that a singular expression encompasses a plural expression, and vice versa. Unless otherwise specified, the expression "or" as used herein means "and/or."

The expressions "an aspect" or "aspects," throughout the present specification mean that a stated specific element may be included in at least one aspect, and may or may not be present in another. It will be understood that described elements may be combined in any suitable manner in various aspects.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, technical and scientific terms used herein have the same meaning as commonly understood by one of ordinary skill in the art to which this specification belongs. All cited patents, patent applications, and other references are incorporated herein by reference in their entirety. However, in the event of any conflict or inconsistency between terms used herein and terms of the cited references, the terms used in this specification take precedence over the terms of the cited references.

While specific aspects have been described, there may be alternatives, modifications, variations, improvements, and substantial equivalents that are presently unforeseen. Accordingly, the claims are intended to embrace all such alternatives, modifications, variations, improvements, and substantial equivalents.

A "halide" is a compound in which one of the elements is a halogen. "Halogen" means one of the elements of Group 17 of the periodic table (e.g., fluorine, chlorine, bromine, iodine, and astatine).

Solid ion conductors include an oxide-based (oxide-containing) solid ion conductor and a sulfide-based (sulfide-containing) solid ion conductor.

An oxide-based solid ion conductor has excellent chemical stability. However, due to their brittleness and stiffness characteristics, it is difficult to achieve interfacial adhesion to an electrode when an oxide-based solid ion conductor is used as a solid electrolyte. For good interfacial adhesion between the oxide-based solid ion conductor and the electrode, an additional process such as sintering or pressing is needed. During this process, the oxide-based solid ion conductor may be deformed or there may be a reaction between the oxide-based solid ion conductor and an electrode active material, thus reducing ion migration at the interface of the solid electrolyte and the electrode.

A sulfide-based solid ion conductor has excellent ionic conductivity, however the chemical stability and electrochemical stability of the sulfide-based solid ion conductor is relatively low. A sulfide-based solid ion conductor reacts with an electrode active material, resulting in decomposition of the sulfide-based solid electrolyte at the interface of the solid electrolyte and the electrode. As a result, a protective film is desirable at the interface of the solid electrolyte with the electrode (i.e., between the solid electrolyte and the electrode).

A solid ion conductor which facilitates ions migration, a solid electrolyte, an electrochemical device including the solid electrolyte, and a method of preparing the solid ion conductor, have been advantageously discovered and are described in detail hereinafter.

Solid Ion Conductor

A solid ion conductor according to an aspect may include a compound represented by Formula 1 having an orthorhombic crystal structure and belonging to a Pnma space group or a Pnma-like space group.

$$Li_{3-x}A_xLuCl_{6-y}X_y \quad \text{Formula 1}$$

In Formula 1,

A may be a monovalent cation having an ionic radius of 76 pm or more,

X may be a monovalent anion, and $0 \leq x \leq 0.1$, $0 \leq y \leq 1$, and $x+y>0$.

The solid ion conductor includes a halide-based compound having a structure in which an A cation is substituted at a lithium (Li) site, an X anion is substituted at a chlorine (Cl) site, or a combination in which an A cation is substituted at a Li site and a X anion is substituted at a Cl site. Within the types and content ranges of the A cation and the X anion, the structure of the halide-based compound may be maintained and the A cation or/and the X anion may be easily substituted within the structure.

The solid ion conductor includes a compound having an orthorhombic crystal structure belonging to a Pnma space group, or a Pnma-like space group, e.g., a space group having a same point group as Pnma. The solid ion conductor maintains structural stability during charge and discharge, and thus is less likely to decompose at the interface with the electrode even if the solid ion conductor reacts with the electrode. The solid ion conductor may have excellent lithium ion conductivity and improved electrochemical stability with an electrode active material, for example, lithium metal. For example, the solid ion conductor including a compound having an orthorhombic crystal structure belonging to a Pnma space group or Pnma-like space may have an improved thermodynamic stability towards reduction of about 1.7 volts (V) or greater when in contact with lithium metal, as compared with a solid ion conductor including a $Li_3InCl_6$ compound. The solid ion conductor may have reduced interfacial resistance with an electrode during charge and discharge.

In Formula 1, A may be $Na^+$, $K^+$, $Rb^+$, $Cs^+$, $Ag^+$, $Au^+$, $Cu^+$, $Hg^+$, $Tl^+$, or a combination thereof. For example, A may be $Na^+$, $Au^+$, $Cu^+$, or a combination thereof. In Formula 1, X may be $Br^-$, $I^-$, or a combination thereof.

For example, the compound may include a compound represented by Formula 2 or Formula 3.

$$Li_{3-x}A_xLuCl_6 \quad \text{Formula 2}$$

In Formula 2, A may be $Na^+$, $K^+$, $Rb^+$, $Cs^+$, $Ag^+$, $Au^+$, $Cu^+$, $Hg^+$, $Tl^+$, or a combination thereof, and $0<x\leq 0.1$.

$$Li_3LuCl_{6-y}X_y \quad \text{Formula 3}$$

In Formula 3, X may be $Br^-$, $I^-$, or a combination thereof, and $0<y\leq 1$.

For example, in Formula 1, A may be $Na^+$, $K^+$, $Rb^+$, $Cs^+$, $Ag^+$, $Au^+$, $Cu^+$, $Hg^+$, $Tl^+$, or a combination thereof, X may be $Br^-$, $I^-$, or a combination thereof, $0<x\leq 0.1$, and $0<y\leq 1$.

The compound may be $Li_{2.95}Na_{0.05}LuCl_6$, $Li_{2.95}K_{0.05}LuCl_6$, $Li_{2.95}Rb_{0.05}LuCl_6$, $Li_{2.95}Cs_{0.05}LuCl_6$, $Li_{2.95}Ag_{0.05}LuCl_6$, $Li_{2.95}Au_{0.05}LuCl_6$, $Li_{2.95}Cu_{0.05}LuCl_6$, $Li_{2.95}Hg_{0.05}LuCl_6$, $Li_{2.95}Tl_{0.05}LuCl_6$, $Li_3LuCl_5Br$, $Li_3LuCl_5I$, $Li_{2.95}Na_{0.05}LuCl_5Br$, $Li_{2.95}K_{0.05}LuCl_5Br$, $Li_{2.95}Rb_{0.05}LuCl_5Br$, $Li_{2.95}Cs_{0.05}LuCl_5Br$, $Li_{2.95}Ag_{0.05}LuCl_5Br$, $Li_{2.95}Au_{0.05}LuCl_5Br$, $Li_{2.95}Cu_{0.05}LuCl_5Br$, $Li_{2.95}Hg_{0.05}LuCl_5Br$, $Li_{2.95}Tl_{0.05}LuCl_5Br$, $Li_{2.95}Na_{0.05}LuCl_5I$, $Li_{2.95}K_{0.05}LuCl_5I$, $Li_{2.95}Rb_{0.05}LuCl_5I$, $Li_{2.95}Cs_{0.05}LuCl_5I$, $Li_{2.95}Ag_{0.05}LuCl_5I$, $Li_{2.95}Au_{0.05}LuCl_5I$, $Li_{2.95}Cu_{0.05}LuCl_5I$, $Li_{2.95}Hg_{0.05}LuCl_5I$, $Li_{2.95}Tl_{0.05}LuCl_5I$, or a combination thereof. For example, the compound may be $Li_{2.95}Na_{0.05}LuCl_6$, $Li_{2.95}K_{0.05}LuCl_6$, $Li_{2.95}Rb_{0.05}LuCl_6$, $Li_{2.95}Cs_{0.05}LuCl_6$, $Li_{2.95}Ag_{0.05}LuCl_6$, $Li_{2.95}Au_{0.05}LuCl_6$, $Li_{2.95}Cu_{0.05}LuCl_6$, $Li_3LuCl_6Br$, $Li_{2.95}Na_{0.05}LuCl_6Br$, $Li_{2.95}K_{0.05}LuCl_6Br$, $Li_{2.95}Rb_{0.05}LuCl_6Br$, $Li_{2.95}Cs_{0.05}LuCl_6Br$, $Li_{2.95}Ag_{0.05}LuCl_6Br$, $Li_{2.95}Au_{0.05}LuCl_6Br$, $Li_{2.95}Cu_{0.05}LuCl_6Br$, or a combination thereof. For example, the compound may be $Li_{2.95}Na_{0.05}LuCl_6$, $Li_{2.66}Ag_{0.05}LuCl_6$, $Li_{2.95}Au_{0.05}LuCl_6$, $Li_{2.95}Cu_{0.05}LuCl_6$, $Li_3LuCl_6Br$, $Li_{2.95}Na_{0.05}LuCl_5Br$, $Li_{2.95}Ag_{0.05}LuCl_5Br$, $Li_{2.95}Au_{0.05}LuCl_5Br$, $Li_{2.95}Cu_{0.05}LuCl_5Br$, or a combination thereof. For example, the compound may have $Li_{2.95}Na_{0.05}LuCl_6$, $Li_{2.95}Ag_{0.05}LuCl_6$, $Li_{2.95}Cu_{0.05}LuCl_6$, $Li_3LuCl_6Br$, $Li_{2.95}Na_{0.05}LuCl_5Br$, $Li_{2.95}Ag_{0.05}LuCl_5Br$, $Li_{2.95}Cu_{0.05}LuCl_6Br$, or a combination thereof. For example, the compound may be $Li_{2.95}Na_{0.05}LuCl_6$, $Li_{2.95}Ag_{0.05}LuCl_6$, $Li_{2.95}Cu_{0.05}LuCl_6$, $Li_3LuCl_6Br$, or a combination thereof.

FIG. 1 is a schematic view showing a crystal structure of a compound of a solid ion conductor, according to an aspect.

As shown in FIG. 1, the solid ion conductor compound, according to an aspect, has a centrosymmetric structure having a unit cell including a first length an x-axis direction, a second length in a y-axis direction, and a third length in a z-axis direction, and the first length, the second length, and the third length are different from each other. The x-axis direction, y-axis direction, and z-axis direction are perpendicular to one another. The compound may have a crystal structure in which Li cations or A cations are positioned around $LuCl_6$ octahedrons. Although not illustrated, Li cations (or A cations) may constitute $LiCl_6$ octahedrons with Cl anions. $LuCl_6$ or $LiX_6$ (where X=Cl or Br) octahedrons are positioned in an edge-sharing manner, and A cations may be positioned at Li sites. In an aspect, $LuCl_6$ octahedrons may be positioned in a non-edge-sharing manner, while $LiX_6$ (where X=Cl or Br) octahedrons may be positioned in an edge-sharing manner.

In an aspect, the solid ion conductor may have a structure belonging to a Pnma space group. The Pnma space group is a centrosymmetric structure, having eight inversion points per unit cell. The compound may have a unit cell including four $2_1$ screw axes per unit cell along each unit cell direction, and two planes per unit cell in a direction perpendicular to each unit cell axis.

In an aspect, the solid ion conductor may have a structure belonging to a Pnma-like space group. As used herein, "Pnma-like space group" means a structure of a compound synthesized by substitution of small amounts of an element into the Pnma space group structure, and which has a XRD peak pattern that corresponds to the peak pattern in an XRD spectrum of the Pnma space group. For example, the corresponding peak pattern may have peaks at a same d-spacing as the solid ion conductor, but shifted to a larger or smaller diffraction angle. For example, a diffraction peak pattern of the structure belonging to the Pnma-like space group includes at least one diffraction peak at 29°2θ to 32°2θ, 33°2θ to 35°2θ, or 34°2θ to 37°2θ, when analyzed using CuKα radiation, and may be similar to the diffraction peak pattern of the structure belonging to the Pnma space group. The solid ion conductor including a compound having a structure belonging to the Pnma space group or the Pnma-like space group maintains structural stability during charge and discharge and is less likely to be decomposed even when a reaction occurs with an electrode active material at the interface. The solid ion conductor may have excellent lithium ion conductivity and improved electrochemical stability when utilized with an electrode including, for example, lithium metal.

Figure 2:
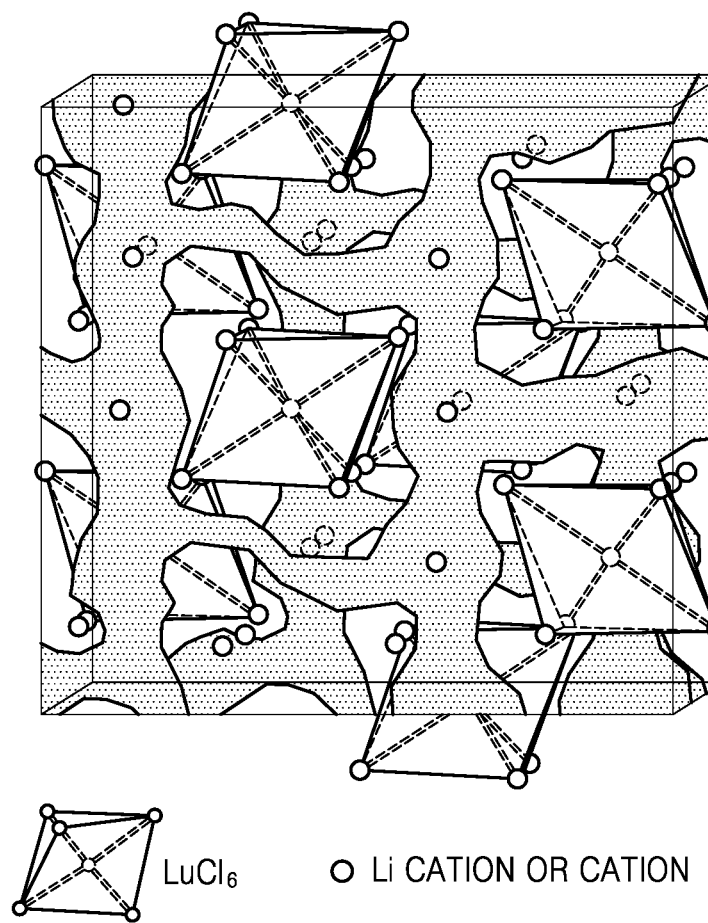
FIG. 2 is a schematic view illustrating an aspect of a network of lithium ion transport channels present in the crystal structure of the solid ion conductor, in which the lithium ion transport channels are three-dimensionally connected.

FIG. 2 is a schematic view illustrating a network of lithium ion transport channels which are three-dimensionally connected within the crystal structure of a solid ion conductor compound, according to an aspect.

As shown in FIG. 2, in the compound of the solid ion conductor according to an aspect, $LuCl_6$ octahedrons are connected in three dimensions in the crystal structure. The compound may have uniform lithium ion transport channels extending in the x-axis direction, the y-axis direction, and the z-axis direction. Spatial distribution of the lithium ion transport channels is determined by the ionic radius of the A cation or the ionic radius of the X anion, which are positioned between $LuCl_6$ octahedrons in the crystal structure. The compound may have improved ionic conductivity since lithium ions can freely move within the orthorhombic crystal structure during charge and discharge.

The compound may exhibit at least one diffraction peak at 29°2θ to 32°2θ, 33°2θ to 35°2θ, and 34°2θ to 37°2θ, when analyzed with CuKα radiation. For example, the compound may exhibit at least one diffraction peak at 29.5°2θ to 32°2θ, 33°2θ to 34.5°2θ, and 34.5°2θ to 36.3°2θ, when analyzed with CuKα radiation.

The diffraction peaks exhibited by the compound may be shifted to a smaller diffraction angle relative to those of a $Li_3LuCl_6$ compound. The compound may have an increase in volume of about 0.1% to about 5% with respect to the volume of the $Li_3LuCl_6$ compound.

The solid ion conductor may have an ionic conductivity of $1\times10^{-1}$ milliSiemens per centimeter (mS/cm) or greater, as measured at 25° C. For example, the solid ion conductor may have an ionic conductivity of about $1.1\times10^{-1}$ mS/cm or greater, about $1.2\times10^{-1}$ mS/cm or greater, about $1.3\times10^{-1}$ mS/cm or greater, about $1.4\times10^{-1}$ mS/cm or greater, or about $1.5\times10^{-1}$ mS/cm or greater, as measured at 25° C. The solid ion conductor may have an ionic conductivity of about $1\times10^{-1}$ mS/cm to about $5\times10^{-1}$ mS/cm, or about $1\times10^{-1}$ mS/cm to about $3\times10^{-1}$ mS/cm, or about $1.4\times10^{-1}$ mS/cm to about $2.7\times10^{-1}$ mS/cm.

The interfacial resistance of the solid ion conductor with respect to lithium metal may be determined from an impedance spectrum obtained using a lithium symmetric cell, in which the solid ion conductor is disposed between lithium metal electrodes, at 25° C. and a frequency range of 1 Hertz (Hz) to $1\times10^6$ Hz. The solid ion conductor may have an interfacial resistance of about 1 ohm square centimeters to about 500 ohm square centimeters ($\Omega \cdot cm^2$) or less when contacted with lithium metal, when measured from an impedance spectrum of a lithium symmetric cell, at 25° C. and a frequency range of 1 Hz to $1\times10^6$ Hz. For example, the solid ion conductor may have an interfacial resistance of about 1 ohm square centimeters to about 490 $\Omega \cdot cm^2$ or less, about 1 ohm square centimeters to about 480 $\Omega \cdot cm^2$ or less, about 1 ohm square centimeters to about 470 $\Omega \cdot cm^2$ or less, about 1 ohm square centimeters to about 460 $\Omega \cdot cm^2$ or less, about 1 ohm square centimeters to about 450 $\Omega \cdot cm^2$ or less, or about 1 ohm square centimeters to about 440 $\Omega \cdot cm^2$ or less, when measured from an impedance spectrum of a lithium symmetric cell, at 25° C. and a frequency range of 1 Hz to $10^6$ Hz. For example, the solid ion conductor may have an interfacial resistance of about 25 $\Omega \cdot cm^2$ to about 500 $\Omega \cdot cm^2$, or about 30 $\Omega \cdot cm^2$ to about 300 $\Omega \cdot cm^2$, or about 40 $\Omega \cdot cm^2$ to about 200 $\Omega \cdot cm^2$, or about 50 $\Omega \cdot cm^2$ to about 110 $\Omega \cdot cm^2$, when measured in a lithium symmetric cell, at 25° C. and a frequency range of 1 Hertz (Hz) to $1\times10^6$ Hz.

Solid Electrolyte and Electrochemical Device

A solid electrolyte according to an aspect may include the above-described solid ion conductor. The solid electrolyte may include a solid ion conductor which comprises, consists of, or consists essentially of the above-described solid ion conductor. The solid electrolyte may further include an oxide-based solid ion conductor, a sulfide-based solid ion conductor, or a combination thereof, in addition to the above-described solid ion conductor.

The solid electrolyte including the above-described solid ion conductor may form a stable interface with the electrode, and without the occurrence of side reactions with the electrode during charge and discharge. The solid ion conductor may include a compound including a network of lithium ion transport channels (e.g., lithium ion transport channels extending in three dimensions), and thus may have increased lithium ion conductivity at room temperature (about 25° C.).

The oxide-based solid ion conductor may include a garnet ceramic ($Li_{3+x}La_3M_2O_{12}$, wherein M is Te, Nb, or Zr, and x is an integer of 1 to 10), lithium phosphorus oxynitride (LiPON, $Li_xPO_yN_z$, wherein 0<x<1, 0<y<1, and 0<z<1), $Li_xP_yO_zN_k$ (wherein 2.7≤x≤3.3, 0.8≤y≤1.2, 3.5≤z≤3.9, and 0.1≤k≤0.5), $Li_wPO_xN_yS_z$ (wherein 0<w<1, 0<x<1, 0<y<1, and 0<z<1), $Li_{1+x+y}Al_xTi_{2-x}Si_yP_{3-y}O_{12}$ (wherein 0<x<2, and 0≤y<3), $BaTiO_3$, $Pb(Zr_aTi_{1-a})O_3$ (where 0≤a≤1, PZT), $Pb_{1-x}La_xZr_{1-y}Ti_yO_3$ (PLZT) (wherein 0≤x<1, and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein 0<x<2, and 0<y<3), lithium aluminum titanium phosphate ($Li_xAl_yTi_z(PO_4)_3$, wherein 0<x<2, 0<y<1, and 0<z<3), $Li_{1+x+y}(Al_aGa_{1-a})_x(Ti_bGe_{1-b})_{2-x}Si_yP_{3-y}O_{12}$ (wherein 0≤x≤1, 0≤y≤1, 0≤a≤1, and 0≤b≤1), a lithium lanthanum titanate ($Li_xLa_yTiO_3$, wherein 0<x<2, and 0<y<3), a lithium germanium thiophosphate ($Li_xGe_yP_zS_w$, 0<x<4, 0<y<1, 0<z<1, 0<w<5), a lithium nitride-based glass ($Li_xN_y$, wherein 0<x<4 and 0<y<2), $SiS_2$ ($Li_xSi_yS_z$, wherein 0<x<3, 0<y<2, and 0<z<4), a $P_2S_5$-based glass ($Li_xP_yS_z$, wherein 0<x<3, 0<y<3, and 0<z<7), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, or a combination thereof. For example, the oxide-based solid ion conductor may include a garnet ceramic having excellent reduction stability when in contact with a lithium negative electrode. The garnet ceramic may be, for example, $Li_{6.5}La_3Zr_{1.5}Ta_{0.5}O_{12}$ (LLZO).

The sulfide-based solid ion conductor may include $Li_2S$—$P_2S_5$, $Li_2S$—$P_2S_5$—LiX (wherein X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are independently a positive number, and Z is Ge, Zn, or Ga), $Li_2S$—$GeS_2$, $Li_2S$—$SiS_2$—$Li_3PO_4$, $Li_2S$—$SiS_2$-$Li_pMO_q$, (wherein p and q are independently a positive number, and M is P, Si, Ge, B, Al, Ga, or In), $Li_{7-x}PS_{6-x}Cl_x$ (wherein 0<x<2), $Li_{7-x}PS_{6-x}Br_x$ (wherein 0<x<2), $Li_{7-x}PS_{6-x}I_x$ (wherein 0<x<2), or a combination thereof. For example, the sulfide-based solid ion conductor may include at least sulfur (S), phosphorus (P), and lithium (Li) elements. For example, the sulfide-based solid ion conductor may include $Li_2S$—$P_2S_5$. When the sulfide-based solid ion conductor is $Li_2S$—$P_2S_5$, a mixed molar ratio of $Li_2S$ to $P_2S_5$ ($Li_2S$:$P_2S_5$) may be, for example, 50:50 to 90:10.

For example, the sulfide-based solid ion conductor may include an argyrodite-type solid ion conductor represented by Formula 4.

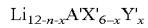

$$Li_{12-n-x}A'X'_{6-x}Y'_x \qquad \text{Formula 4}$$

In Formula 4,

A' is P, As, Ge, Ga, Sb, Si, Sn, Al, In, Ti, V, Nb, or Ta;
X' is S, Se, or Te;
Y' is Cl, Br, I, F, CN, OCN, SCN, or $N_3$; and
1<n<5, and 0<x<2.

The oxidation number of A' is +n, the oxidation number of X' is −2, and the oxidation number of Y' is −1.

The sulfide-based solid ion conductor may be an argyrodite-type compound including $Li_{7-x}PS_{6-x}Cl_x$ (wherein 0≤x≤2), $Li_{7-x}PS_{6-x}Br_x$ (wherein 0≤x≤2), $Li_{7-x}PS_{6-x}I_x$ (wherein 0≤x≤2), or a combination thereof. For example, the sulfide-based solid ion conductor may be an argyrodite-type compound including $Li_6PS_5Cl$, $Li_6PS_5Br$, $Li_6PS_5I$, or a combination thereof.

The solid electrolyte may further include a binder. For example, the binder included in the solid electrolyte may include styrene butadiene rubber (SBR), polytetrafluoroethylene, polyvinylidene fluoride, polyethylene, or a combination thereof. However, aspects are not limited thereto, and suitable binder may be used.

The solid electrolyte may further include an organic solid electrolyte. The organic solid electrolyte may be, for example, a polyethylene derivative, a polyethylene oxide derivative, a polypropylene oxide derivative, a phosphate ester polymer, a poly-L-lysine polymer, a polyester sulfide, a polyvinyl alcohol, a polyvinylidene fluoride, a polymer including an ionic dissociation group, or a combination thereof. The solid electrolyte may further include an amorphous solid electrolyte. The solid electrolyte may include a mixed solid electrolyte in which a crystalline solid electrolyte and an amorphous solid electrolyte are combined together as a mixture. The solid electrolyte may further include a lithium salt, an ionic liquid, or a combination thereof.

The solid electrolyte may be in the form of powder or a molded product. The molded product may be in the form of, for example, a pellet, a sheet, or a thin film, but not limited thereto, and may have various forms according to desired use. An electrochemical device according to another aspect may include a positive electrode layer, a negative electrode layer, and a solid electrolyte layer between the positive electrode layer and the negative electrode layer, wherein the solid electrolyte comprises the solid ion conductor.

The solid electrolyte may be included in the solid electrolyte layer, the positive electrode layer, the negative electrode layer, or a combination thereof.

Also disclosed is a protected positive electrode comprising a positive electrode layer; and a protection layer comprising the solid ion conductor on the positive electrode layer.

Also disclosed is a protected negative electrode comprising a negative electrode layer; and a protection layer comprising the solid ion conductor on the negative electrode layer.

The electrochemical device may further include the positive-electrode protection layer, the negative-electrode protection layer, or a combination thereof.

The solid electrolyte may have a thickness of about 10 micrometers (μm) to about 1 millimeter (mm) and may have a single layer structure or a multilayer structure. For example, the solid electrolyte layer may have a thickness of about 20 μm to about 900 μm, or about 50 μm to about 750 μm, or about 100 μm to about 500 μm.

For example, the solid electrolyte layer may include a solid electrolyte including a solid ion conductor including a compound represented by Formula 1 having an orthorhombic crystal structure and belonging to a Pnma space group or Pnma-like space group. In an aspect, the solid electrolyte layer may include a solid electrolyte consisting of, or consisting essentially of, the solid ion conductor having a structure represented by Formula 1. In an aspect, the solid electrolyte layer may further include an oxide-based solid ion conductor or a sulfide-based solid ion conductor as a separate layer, in addition to the solid ion conductor.

For example, the positive electrode layer, the negative electrode layer, or a combination thereof, may include a solid ion conductor including a compound represented by Formula 1 and having a Pnma space group or Pnma-like space group crystal structure. In an aspect, the positive electrode layer, the negative electrode layer, or a combination thereof, may include a solid electrolyte consisting of, or consisting essentially of the solid ion conductor having a structure represented by Formula 1 and having an orthorhombic crystal structure. In an aspect, in addition to the solid ion conductor, the positive electrode layer, the negative electrode layer, or a combination thereof, may further include an oxide-based solid ion conductor solid electrolyte, an ionic liquid-containing electrolyte, or a combination thereof, as a separate single layer or multilayer structure.

For example, the electrochemical device may include, in the stated order, a positive electrode layer, an ionic-liquid-containing electrolyte, an oxide-based solid ion conductor solid electrolyte, a solid ion conductor solid electrolyte containing a compound represented by Formula 1 having an orthorhombic crystal structure, and belonging to a Pnma space group or Pnma-like space group, an oxide-based solid ion conductor solid electrolyte, and a negative electrode layer.

The electrochemical device may be an all-solid secondary battery or a metal-air battery. However, aspects are not limited thereto, and any usable electrochemical device may be used.

For example, the electrochemical device may be an all-solid-state secondary battery.

Figure 4:
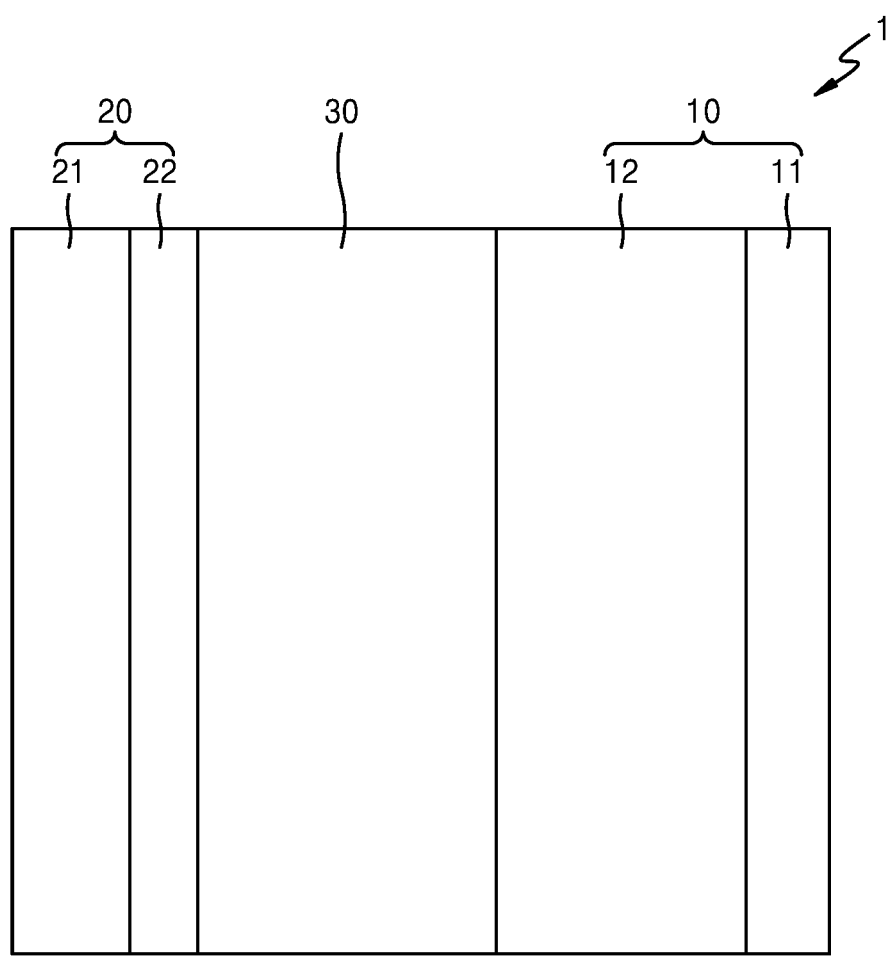
FIGS. 4 to 6 are cross-sectional views of all-solid secondary batteries according to aspects.
Figure 5:
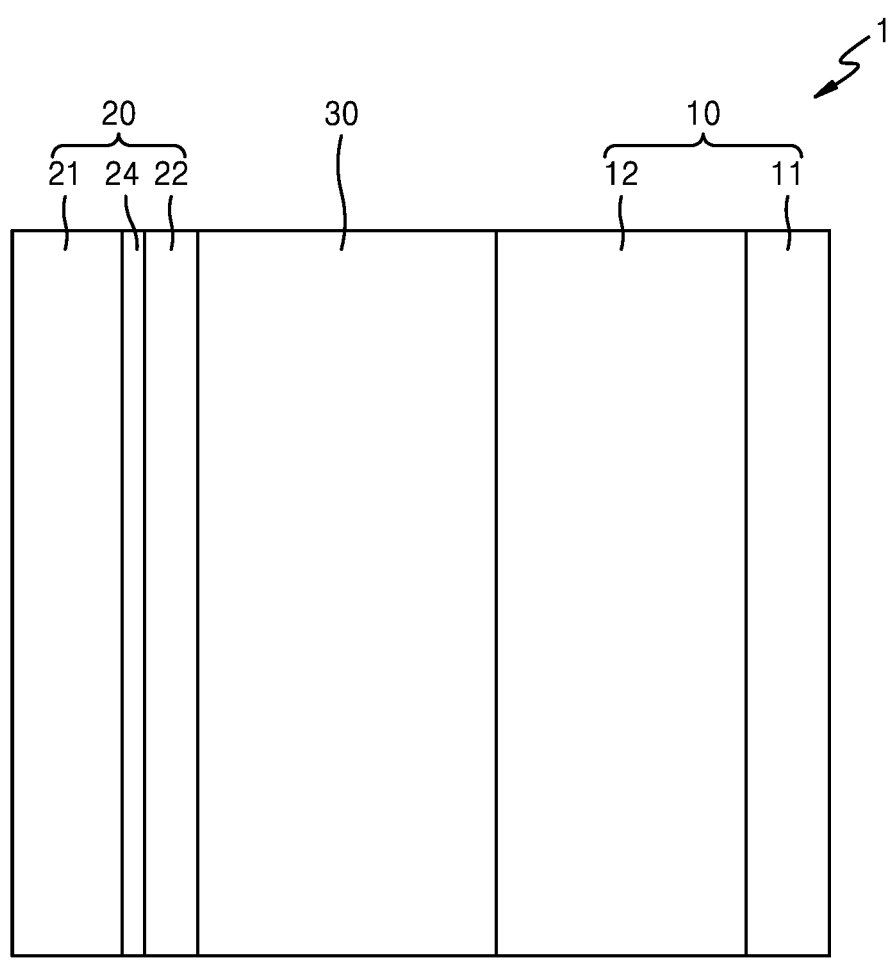
Figure 6:
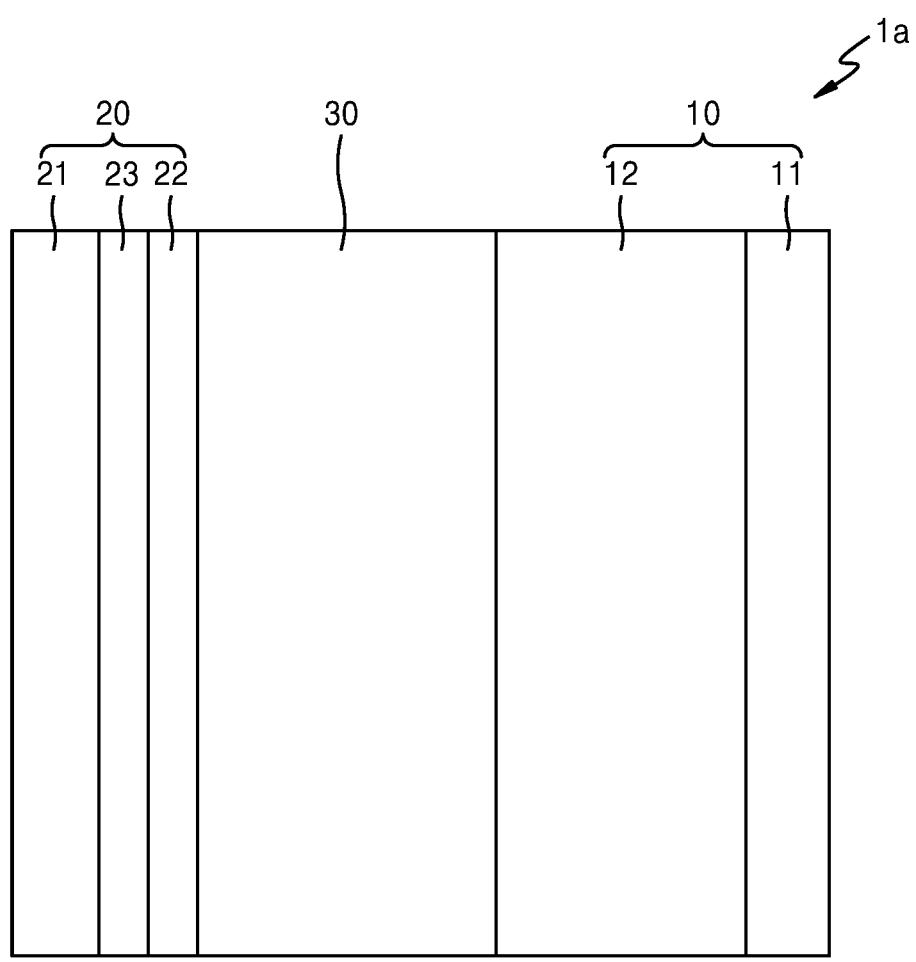

FIGS. 4 to 6 are cross-sectional views of all-solid-state secondary batteries according to aspects.

Referring to FIGS. 4 to 6, an all-solid-state secondary battery 1 includes: a positive electrode layer 10 including a positive electrode current collector 11 and a positive electrode active material layer 12; a negative electrode layer 20 including a negative electrode current collector 21, and a negative electrode active material layer 22 disposed on the negative electrode current collector 21; and a solid electrolyte layer 30 between the positive electrode layer 10 and the negative electrode layer 20. The negative electrode active material layer 22 may comprise lithium metal, or a negative electrode active material that forms an alloy or a compound with lithium. The positive electrode layer 10, the negative electrode layer 20, the solid electrolyte layer 30 of the all-solid-state secondary battery 1, or a combination thereof includes the above-described solid ion conductor including a compound represented by Formula 1 and belonging to a Pnma space group or Pnma-like space group.

The positive electrode current collector 11 may include, for example, a plate or foil comprising, or consisting of, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The positive electrode current collector 11 may be omitted.

The positive electrode active material layer 12 may include a positive electrode active material, a solid electrolyte, or a combination thereof. The solid electrolyte included in the positive electrode layer 10 may be the same as or different from the solid electrolyte included in the solid electrolyte layer 30.

The positive electrode active material may be a positive electrode active material capable of reversibly absorbing and desorbing lithium ions. For example, the positive electrode active material may include a lithium cobalt oxide (hereinafter referred to as LCO), a lithium nickel oxide, a lithium nickel cobalt oxide, lithium nickel cobalt aluminum oxide (hereinafter referred to as NCA), lithium nickel cobalt manganese oxide (hereinafter referred to as NCM), lithium manganate, lithium iron phosphate, nickel sulfide, copper sulfide, lithium sulfide, iron oxide, vanadium oxide, or a combination thereof. These positive electrode active materials may be used alone or in combination of two or more.

For example, the positive electrode active material may be a lithium salt of a ternary transition metal oxide, such as $LiNi_xCo_yAl_zO_2$ (NCA) or $LiNi_xCo_yMn_zO_2$ (NCM) (wherein $0<x<1$, $0<y<1$, $0<z<1$, and $x+y+z=1$).

The positive electrode active material may have a coating layer on the positive electrode active material. Any coating layer can be used as long as it is suitable for use as a coating layer for the positive electrode active material of an all-solid-state secondary battery. As an example of the coating layer, for example, $Li_2O-ZrO_2$ may be used.

In addition, when the positive electrode active material is formed of a lithium salt of a ternary transition metal oxide such as NCA or NCM, and nickel (Ni) is included as the positive electrode active material, the capacity density of the all-solid-state secondary battery 1 is increased and the elution of metal in the cathode active material can be reduced when the battery is charged. The all-solid secondary battery 1 may have improved long-term reliability and cycle characteristics when charged.

The positive electrode active material may be in the form of particles, for example, particles having a shape of an ellipse, a sphere, or a combination thereof. In addition, the particle diameter of the positive electrode active material is not limited, and any particle diameter is applicable as long as it is within a range suitable for the positive electrode active material of an all-solid secondary battery. The amount of the positive electrode active material of the positive electrode layer 10 is also not limited, and any amount is applicable as long as it is within a range suitable for the positive electrode of an all-solid secondary battery.

The positive electrode layer 10 may further include, in addition to the above-described positive electrode active material or/and solid electrolyte, an additive, for example, a conductive agent, a binder, a filler, a dispersant, an ion-conductive auxiliary agent, or a combination thereof.

A conductive agent which may be included in the positive electrode layer 10 may be graphite, carbon black, acetylene black, ketjen black, carbon fiber, metal powder, or a combination thereof. A binder that may be included in the positive electrode layer 10 may be styrene butadiene rubber (SBR), polytetrafluoroethylene, polyvinylidene fluoride, polyethylene, or a combination thereof. Other additives such as a coating agent, a dispersant, an ion-conductive auxiliary agent, or the like, that may be included in the positive electrode layer 10, may be any material suitable for use in an electrode of an all-solid secondary battery.

The protected positive electrode may be prepared by deposition using a film forming method such as an aerosol deposition method, a cold spray method, a sputtering method, or a combination thereof. In an aspect, the protected positive electrode may be manufactured providing a positive electrode, and disposing the solid ion conductor on the positive electrode, for example by coating and drying a composition comprising the solid ion conductor on the positive electrode to manufacture the protected negative electrode.

The negative electrode layer 20 may include a negative electrode current collector 21 and a negative electrode active material layer 22.

A material constituting the negative electrode current collector 21 may be copper (Cu), stainless steel, titanium (Ti), iron (Fe), cobalt (Co), nickel (Ni), or a combination thereof. The negative electrode current collector 21 may consist of a single metal or may consist of an alloy of two or more types of metals or a coating material. The negative electrode current collector 21 may be formed, for example, in the shape of a plate or foil.

The negative electrode active material layer 22 may include lithium or an alloy of lithium and a metal capable of forming an alloy with lithium. The metal capable of forming an alloy with lithium may include indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof. However, aspects are not limited thereto, and any metal available in the art capable of forming an alloy with lithium may be used.

The negative electrode active material layer 22 may further include a carbonaceous negative electrode active material. As the carbonaceous negative active material, graphite, carbon black (CB), acetylene black (AB), furnace black (FB), ketjen black (KB), graphene, carbon nanotubes, carbon nanofibers, or a combination thereof, may be used.

The negative electrode active material layer 22 may be appropriately mixed with additives such as a conductive agent, a binder, a filler, a dispersant, an ion-conductive auxiliary agent, or a combination thereof.

The negative electrode active material layer 22 may be a negative-electrode-free coating layer. For example, the negative-electrode-free coating layer may have a structure in which metalloid such as silicon and carbon are contained and a conductive binder is disposed around the metalloid and the carbon. The negative-electrode-free coating layer may have a thickness of 1 μm to 20 μm.

The protected negative electrode may be prepared by deposition using a film forming method such as an aerosol deposition method, a cold spray method, a sputtering method, or a combination thereof. In an aspect, the protected negative electrode may be manufactured providing a negative electrode, and disposing the solid ion conductor on the negative electrode, for example by coating and drying a composition comprising the solid ion conductor on the negative electrode to manufacture the protected negative electrode.

The solid electrolyte layer 30 may be prepared by deposition using a film forming method such as an aerosol deposition method, a cold spray method, a sputtering method, or a combination thereof. In an aspect, the solid electrolyte layer 30 may be manufactured by pressing a solid electrolyte particle. In other aspects, the solid electrolyte layer 30 may be manufactured by combining a solid electrolyte with a solvent and a binder to prepare a mixture, and coating, drying, and pressing the mixture to thereby manufacture the solid electrolyte layer 30.

As shown in FIG. 5, a thin film 24 may be formed on a surface of the negative electrode current collector 21. The thin film 24 may include an element capable of forming an alloy with lithium. The element capable of forming an alloy with lithium may be, for example, a metal such as gold, silver, zinc, tin, indium, silicon, aluminum, bismuth, or a combination thereof. The thin film 24 may consist of one of these metals or may consist of an alloy of two or more of these metals. Due to the presence of the thin film 24, the deposition pattern of the metal layer 23 shown in FIG. 6 may be further flattened, and the characteristics of the solid secondary battery 1 can be further improved.

A thickness of the thin film 24 may be 1 nanometer (nm) to 500 nm, about 10 nm to about 400 nm, about 50 nm to about 300 nm, or about 100 nm to about 200 nm, but is not limited thereto. When the thickness of the thin film 24 is within the above range, the thin film 24 sufficiently performs its function and the amount of lithium precipitated in the negative electrode layer is appropriate, so that the all-solid secondary battery 1 have excellent characteristics. The thin film 24 may be formed on the negative electrode current collector 21 by, for example, a vacuum evaporation method, a sputtering method, a plating method, or the like.

Method of Preparing Solid Ion Conductor

A method of preparing a solid ion conductor, according to the present invention, may include: providing a precursor mixture; and mechanically milling the precursor mixture to prepare the solid ion conductor, wherein the solid ion conductor include a compound represented by Formula 1 having an orthorhombic crystal structure, and belonging to a Pnma space group or Pnma-like space group.

$$Li_{3-x}A_xLuCl_{6-y}X_y \quad \text{Formula 1}$$

In Formula 1,
A may be a monovalent cation having an ionic radius of 76 pm or more;
X may be a monovalent anion; and
$0 \leq x \leq 0.1$, $0 \leq y \leq 1$, and $x+y>0$.

The method of preparing a solid ion conductor may facilitate preparation of a solid ion conductor having improved ionic conductivity and low interfacial resistance.

In preparing the precursor mixture, a lithium precursor, an A precursor, a lutetium precursor, and an X precursor may be mixed together. In Formula 1, when x is 0, the A precursor may be omitted, and when y is 0, the X precursor may be omitted.

The lithium precursor and the X precursor may include a chloride, a halide, an lithium oxide, a lithium nitride, a lithium oxynitride, a lithium nitrate, a lithium hydroxide, a lithium carbonate, or a combination thereof. For example, the lithium precursor may be a lithium chloride. For example, the X precursor may be a lithium halide.

The A precursor may include a metal chloride, a metal oxide, a metal nitride, a metal oxynitride, a metal nitrate, a metal hydroxide, a metal carbonate, or a combination thereof, where the metal may include sodium, potassium, rubidium, cesium, silver, gold, copper, mercury, thallium, or a combination thereof. For example, the A precursor may be a sodium chloride, a potassium chloride, a rubidium chloride, a cesium chloride, a silver chloride, a gold chloride, a copper chloride, a mercury chloride, a thallium chloride, or a combination thereof.

The lutetium precursor may include a lutetium chloride, a lutetium oxide, a lutetium nitride, a lutetium oxynitride, a lutetium nitrate, a lutetium hydroxide, a lutetium carbonate, or a combination thereof. For example, the lutetium precursor may be a lutetium chloride.

The precursor mixture for forming a solid ion conductor may be prepared, for example, by contacting the starting (precursor) materials in appropriate stoichiometric amounts and mixing the starting materials. The mixing of the starting materials may include mechanical milling.

The mechanical milling may include ball milling, airjet milling, bead milling, roll milling, hand milling, high-energy ball milling, planetary milling, stirred ball milling, vibrating milling, mechanofusion milling, shaker milling, attritor milling, disk milling, shape milling, nauta milling, Nobilta™ milling, high-speed mixing, or a combination thereof. For example, the mechanical milling may include planetary milling (e.g., ball milling with a planetary mill), and may be performed at room temperature.

Hereinafter, aspects of the present disclosure will be described in detail with reference to the following examples and comparative examples. These examples and comparative examples are not intended to limit the purpose and scope of the present disclosure.

EXAMPLES

Example 1: Preparation of $Li_{2.95}Na_{0.05}LuCl_6$ Solid Ion Conductor

LiCl as a lithium precursor, NaCl as a sodium precursor, and $LuCl_3$ as a lutetium precursor were added into a reactor in a stoichiometric ratio and mixed to provide a precursor mixture for forming a solid ion conductor. The precursor mixture for forming a solid ion conductor was ball-milled using a planetary mill (Pulverisette™ 7 premium line, Fritsch GmbH) including zirconia (YSZ) balls having a diameter of 10 mm added thereinto, at 700 rotations per minute (rpm) for 24 hours in total to prepare a $Li_{2.95}Na_{0.05}LuCl_6$ solid ion conductor. The $Li_{2.95}Na_{0.05}LuCl_6$ solid ion conductor has an orthorhombic crystal structure and belongs to a Pnma-like space group.

Example 2: Preparation of $Li_{2.95}Cu_{0.05}LuCl_6$

A $Li_{2.95}Cu_{0.05}LuCl_6$ solid ion conductor was prepared in the same manner as in Example 1, except that CuCl as a copper precursor, instead of the sodium precursor NaCl, was used in the reactor. The $Li_{2.95}Cu_{0.05}LuCl_6$ solid ion conductor has a orthorhombic crystal structure and belongs to a Pnma-like space group.

Example 3: Preparation of $Li_{2.95}Ag_{0.05}LuCl_6$ Solid Ion Conductor

A $Li_{2.95}Ag_{0.05}LuCl_6$ solid ion conductor was prepared in the same manner as in Example 1, except that AgCl as a silver precursor, instead of the sodium precursor NaCl, was used in the reactor. The $Li_{2.95}Ag_{0.05}LuCl_6$ solid ion conductor has an orthorhombic crystal structure and belongs to a Pnma-like space group.

Example 4: Preparation of $Li_3LuCl_6Br$ Solid Ion Conductor

A $Li_3LuCl_6Br$ solid ion conductor was prepared in the same manner as in Example 1, except that LiBr as a bromine precursor, instead of the sodium precursor NaCl, was used in the reactor. The $Li_3LuCl_6Br$ solid ion conductor has an orthorhombic crystal structure and belongs to a Pnma-like space group.

Comparative Example 1: Preparation of $Li_3LuCl_6$ Solid Ion Conductor

A $Li_3LuCl_6$ solid ion conductor was prepared in the same manner as in Example 1, except that LiCl as a lithium precursor and $LuCl_3$ as a lutetium precursor were added into the reactor in a stoichiometric ratio. The $Li_3LuCl_6$ solid ion conductor has an orthorhombic crystal structure and belongs to a Pnma space group.

Comparative Example 2: Preparation of $Li_3LuCl_3Br_3$ Solid Ion Conductor

A $Li_3LuCl_3Br_3$ solid ion conductor was prepared in the same manner as in Example 1, except that LiCl as a lithium precursor, $LuCl_3$ as a lutetium precursor, and LiBr as a bromine precursor were added into the reactor in a stoichiometric ratio. The $Li_3LuCl_3Br_3$ solid ion conductor has an orthorhombic crystal structure and belongs to a C2/m-like space group.

Comparative Example 3: Preparation of $Li_3LuBr_6$ Solid Ion Conductor

A $Li_3LuBr_6$ solid ion conductor was prepared in the same manner, except that LiBr as a lithium precursor and $LuBr_3$ as a lutetium precursor were added into the reactor in a stoichiometric ratio. The $Li_3LuBr_6$ solid ion conductor has a monoclinic crystal structure and belongs to a C2/m space group.

Comparative Example 4: Preparation of $Li_3InCl_6$ Solid Ion Conductor

A $Li_3InCl_6$ solid ion conductor was prepared in the same manner as in Example 1, except that $InCl_3$ as an indium precursor, instead of the sodium precursor NaCl, was added into the reactor in a stoichiometric ratio. The $Li_3InCl_6$ solid ion conductor has a monoclinic crystal structure and belongs to a C2/m space group.

Comparative Example 5: Preparation of $Li_3ErCl_6$ Solid Ion Conductor

A $Li_3ErCl_6$ solid ion conductor was prepared in the same manner as in Example 1, except that $ErCl_3$ as an erbium precursor, instead of the sodium precursor NaCl, was added into the reactor in a stoichiometric ratio. The $Li_3ErCl_6$ solid ion conductor has a trigonal crystal structure and belongs to a P-3m1 space group.

Comparative Example 6: Preparation of $Li_3DyCl_6$ Solid Ion Conductor

A $Li_3DyCl_6$ solid ion conductor was prepared in the same manner as in Example 1, except that $DyCl_3$ as a dysprosium precursor, instead of the sodium precursor NaCl, was added into the reactor in a stoichiometric ratio. The $Li_3DyCl_6$ solid ion conductor has a trigonal crystal structure and belongs to a P-3m1 space group.

Analysis Example 1: X-Ray Diffraction (XRD)

XRD spectra of the solid ion conductors prepared according to Example 1, Example 4, and Comparative Examples 1-3 were measured with CuKα radiation. The results are shown in FIGS. 3A and 3B.

Figure 3A:
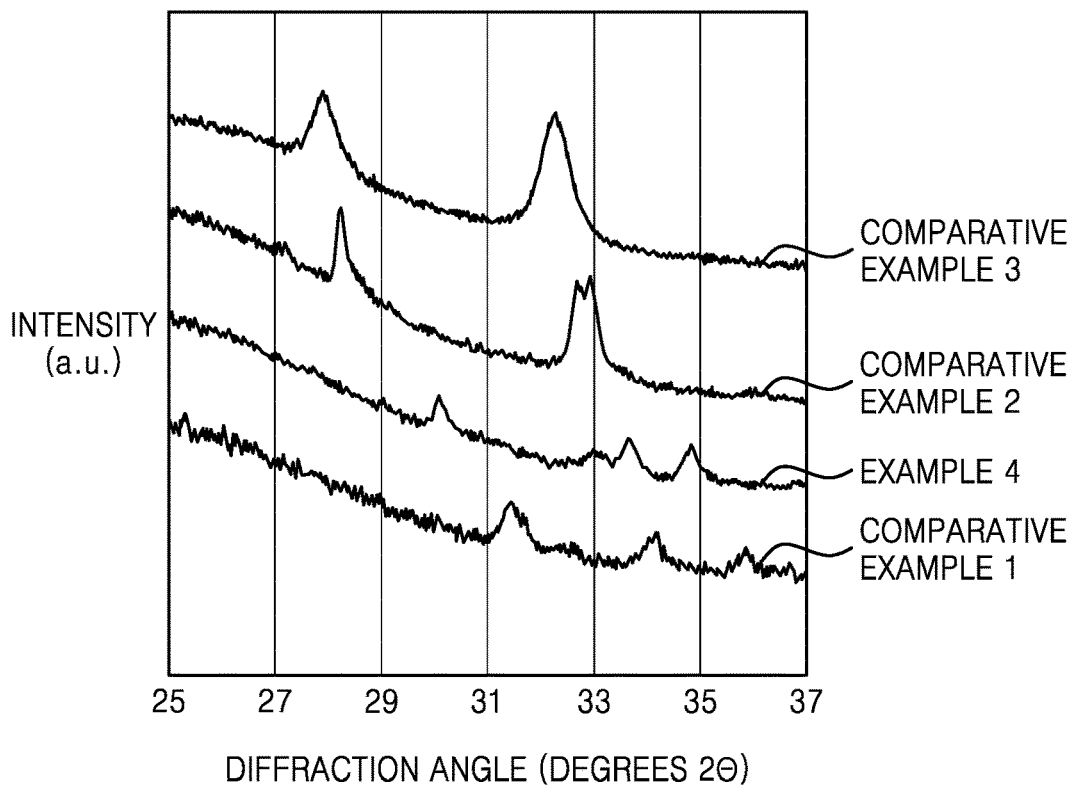
FIG. 3A is a graph of intensity (arbitrary units, a.u.) versus diffraction angle (degrees two-theta, 2θ), which shows the X-ray diffraction (XRD) spectra of the solid ion conductor compounds prepared in Example 4 and Comparative Examples 1 to 3, when analyzed with CuKα radiation.
Figure 3B:
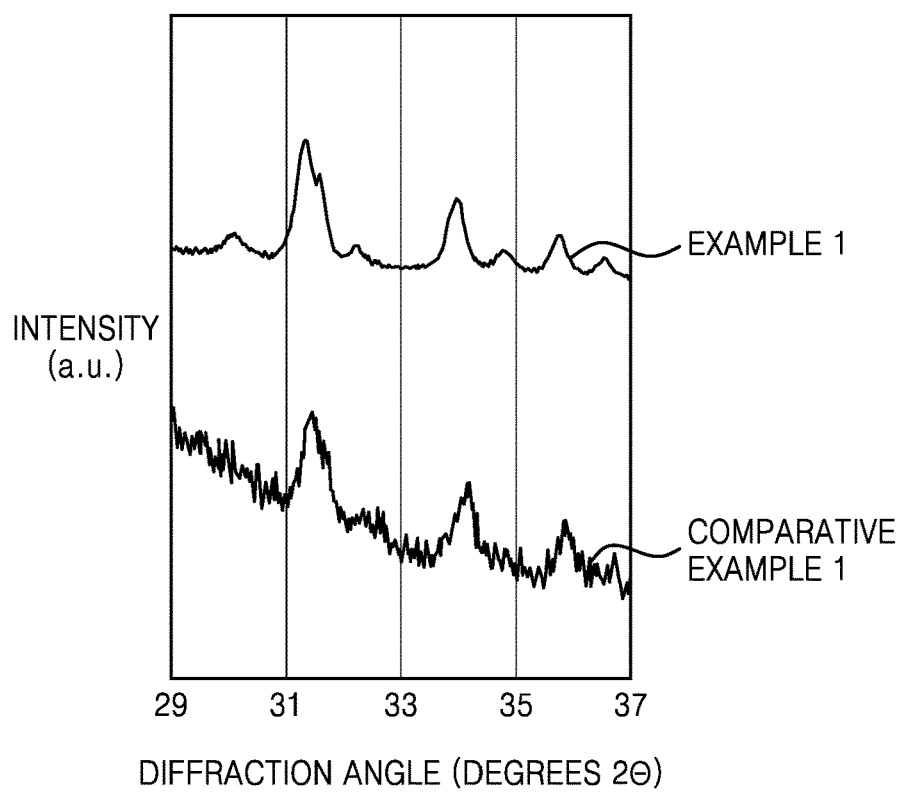
FIG. 3B is a graph of intensity (a.u.) versus diffraction angle (degrees 2θ), which shows the XRD spectra of the solid ion conductor compounds prepared in Example 1 and Comparative Example 1, when analyzed with CuKα radiation.

Referring to FIGS. 3A and 3B, it was observed that the compounds of the solid ion conductors prepared according to Example 1 and Example 4 exhibited peaks in a region of 29.5°2θ to 32°2θ, in region of 33°2θ to 34.5°2θ, and in a region of 34.5°2θ to 36.3°2θ. This is similar to the diffraction peaks of the $Li_3LuCl_6$ solid ion conductor prepared in Comparative Example 1, having an orthorhombic crystal structure belonging to a Pnma space group. From this, it is found that the compounds of the solid ion conductors of Examples 1 and 4 have an orthorhombic crystal structure belonging to a Pnma-like space group crystal structure.

The regions in which the diffraction peaks of the compound of the solid ion conductor prepared in Example 4 were observed was shifted to the left relative to the diffraction peaks of the $Li_3LuCl_6$ solid ion conductor prepared in Comparative Example 1. From the relationship between the diffraction angle (2θ) and the interplanar distance (d) according to Bragg's law (2d sin Θ=nλ), the compound of the solid ion conductor prepared in Example 4 appears to have a volume increase of about 4% relative to the volume of the $Li_3LuCl_6$ solid ion conductor prepared in Comparative Example 1.

Evaluation Example 1: Ionic Conductivity Measurement

Specimen pellets having a thickness of about 500 μm were prepared from the solid ion conductors prepared in Examples 1-4 and Comparative Examples 1-6. Gold (Au) paste was deposited on the upper and lower sides of the solid ion conductor pellets by sputtering to form electrodes, followed by heat treatment at 700° C. for 1 hour in air. The impedance of the specimen having the electrodes formed thereon was measured by a 2-probe method using an impedance analyzer (Biologic VMP3). The frequency range was 1 Hz to 1 megahertz (MHz), and the amplitude voltage was 200 millivolts (mV). The measurement was performed at 25° C. in an air atmosphere. A resistance value was calculated from the arc of the Nyquist plot of the impedance measurement results, and the ion conductivity was calculated in consideration of the area and thickness of the specimen. The results are shown in Table 1.

TABLE 1

|  | Ionic conductivity (S/cm, @ 25° C.) |
| --- | --- |
| Example 1 | 0.26 |
| Example 2 | 0.15 |
| Example 3 | 0.25 |
| Example 4 | 0.21 |
| Comparative Example 1 | 0.05 |
| Comparative Example 2 | 0.28 |
| Comparative Example 3 | 0.03 |
| Comparative Example 4 | 0.34 |
| Comparative Example 5 | <0.01 |
| Comparative Example 6 | 0.04 |

Referring to Table 1, the solid ion conductors prepared in Example 1 to Example 4 had an ionic conductivity of $1\times10^{-1}$ mS/cm or greater at 25° C. The solid ion conductors prepared according to Examples 1 to 4 have improved ionic conductivity as compared to Comparative Examples 1, 3, 5, and 6.

Evaluation Example 2: Interfacial Resistance Measurement

A lithium foil having a thickness of 8 mm was disposed on one side of each of the solid ion conductor pellets prepared in Examples 1-4 and Comparative Examples 1-6 and then attached thereto as a lithium electrode using cold isotactic pressing (ISP) by applying a pressure of 250 megapascals (MPa) at 25° C.

A lithium electrode was attached to the opposite side of the pellet in the same manner to prepare a symmetrical cell of lithium/solid electrolyte/lithium. Current collectors were disposed on the lithium electrodes disposed on the opposite sides of each pellet, and while sealing the symmetrical cell, a portion of each of the current collectors protruded to the outside for use as electrode terminals. The prepared symmetrical cells were used to measure the interface resistance of the pellets.

Using a Biologic VMP3 as an impedance analyzer, the impedance of the symmetric cells was measured by a 2-probe method. The impedance measurement was performed in a dry room atmosphere, having a dew point temperature of −60° C. or less at 25° C., an amplitude of 200 mV, and a frequency range of 1 Hz to 1 MHz.

Interfacial resistance was measured from the size of the arc of the Nyquist plot of the impedance measurement result. The results are shown in Table 2.

TABLE 2

|  | Interfacial resistance ($\Omega \cdot cm^2$) |
| --- | --- |
| Example 1 | 53 |
| Example 2 | 440 |
| Example 3 | 225 |
| Example 4 | 103 |
| Comparative Example 1 | 508 |
| Comparative Example 2 | 4008 |
| Comparative Example 3 | 3880 |
| Comparative Example 4 | 3280 |
| Comparative Example 5 | >10000 |
| Comparative Example 6 | 6140 |

Referring to Table 2, the solid ion conductors prepared in Examples 1-4 had an interfacial resistance of 440 $\Omega \cdot cm^2$ or less. The solid ion conductors prepared according to Examples 1-4 had a significantly reduced interfacial resistance as compared to the solid ion conductors of Comparative Examples 1 to 6.

From this, it was found that the solid ion conductor according to an aspect includes a compound having an orthorhombic crystal structure, belonging to a Pnma space group or a Pnma-like space group, and substituted with a monovalent cation or/and a monovalent anion at a Li site or/and Cl site, respectively, and having an increased volume in a three-dimensional direction.

The solid ion conductor according to one aspect includes a compound having an orthorhombic crystal structure, belonging to a Pnma space group or a Pnma-like space group, and substituted with a monovalent cation or/and monovalent anion at a Li site or/and Cl site, respectively. The solid ion conductor may have improved ionic conductivity and reduced interfacial resistance.

The solid ion conductor may be included in an electrochemical device, for example, in a solid electrolyte layer, a positive electrode layer, a negative electrode layer, a positive-electrode-layer protective film, a negative-electrode-layer protective film, or a combination thereof, of an all-solid-state secondary battery or a metal-air battery.

The aspects described herein should be considered in a descriptive sense only and not for purposes of limitation. Descriptions of various features or aspects should be considered as available for other similar features or aspects. While one or more aspects have been described with reference to the figures, it will be understood by those of ordinary skill in the art that various changes in form and details may be made therein without departing from the spirit and scope as defined by the following claims.

What is claimed is:

1. A solid ion conductor comprising a compound represented by Formula 1 having an orthorhombic crystal structure, and belonging to a Pnma space group or a Pnma-like space group:

$$Li_{3-x}A_xLuCl_{6-y}X_y \quad \text{Formula 1}$$

wherein, in Formula 1,
A is a monovalent cation having an ionic radius of 76 picometers or greater,
X is a monovalent anion, and
$0 < x \leq 0.1$, $0 \leq y \leq 1$, and $x+y>0$.

2. The solid ion conductor of claim 1, wherein A is $Na^+$, $K^+$, $Rb^+$, $Cs^+$, $Ag^+$, $Au^+$, $Cu^+$, $Hg^+$, $Tl^+$, or a combination thereof.

3. The solid ion conductor of claim 1, wherein X is $Br^-$, $I^-$, or a combination thereof.

4. The solid ion conductor of claim 1, wherein, in Formula 1, A is $Na^+$, $K^+$, $Rb^+$, $Cs^+$, $Ag^+$, $Au^+$, $Cu^+$, $Hg^+$, $Tl^+$, or a combination thereof, X is $Br^-$, $I^-$, or a combination thereof, and $0<x\leq 0.1$, and $0<y\leq 1$.

5. The solid ion conductor of claim 1, wherein the compound is represented by Formula 2:

$$Li_{3-x}A_xLuCl_6 \quad \text{Formula 2}$$

wherein, in Formula 2,
A is $Na^+$, $K^+$, $Rb^+$, $Cs^+$, $Ag^+$, $Au^+$, $Cu^+$, $Hg^+$, $Tl^+$, or a combination thereof, and $0<x\leq 0.1$.

6. The solid ion conductor of claim 1, wherein the compound is $Li_{2.95}Na_{0.05}LuCl_6$, $Li_{2.95}K_{0.05}LuCl_6$, $Li_{2.95}Rb_{0.05}LuCl_6$, $Li_{2.95}Cs_{0.05}LuCl_6$, $Li_{2.95}Ag_{0.05}LuCl_6$, $Li_{2.95}Au_{0.05}LuCl_6$, $Li_{2.95}Cu_{0.05}LuCl_6$, $Li_{2.95}Hg_{0.05}LuCl_6$, $Li_{2.95}Tl_{0.05}LuCl_6$, $Li_{2.95}Na_{0.05}LuCl_5Br$, $Li_{2.95}K_{0.05}LuCl_5Br$, $Li_{2.95}Rb_{0.05}LuCl_5Br$, $Li_{2.95}Cs_{0.05}LuCl_5Br$, $Li_{2.95}Ag_{0.05}LuCl_5Br$, $Li_{2.95}Au_{0.05}LuCl_5Br$, $Li_{2.95}Cu_{0.05}LuCl_5Br$, $Li_{2.95}Hg_{0.05}LuCl_5Br$, $Li_{2.95}Tl_{0.05}LuCl_5Br$, $Li_{2.95}Na_{0.05}LuCl_5I$, $Li_{2.95}K_{0.05}LuCl_5I$, $Li_{2.95}Rb_{0.05}LuCl_5I$, $Li_{2.95}Cs_{0.05}LuCl_5I$, $Li_{2.95}Ag_{0.05}LuCl_5I$, $Li_{2.95}Au_{0.05}LuCl_5I$, $Li_{2.95}Cu_{0.05}LuCl_5I$, $Li_{2.95}Hg_{0.05}LuCl_5I$, $Li_{2.95}Tl_{0.05}LuCl_5I$, or a combination thereof.

7. The solid ion conductor of claim 1, wherein the compound has a centrosymmetric structure having a unit cell comprising
a first length in an x-axis direction, a second length in a y-axis direction, and a third length in a z-axis direction, and
eight inversion points,
wherein the x-axis direction, the y-axis direction, and the z-axis direction are perpendicular to one another, and the first length, the second length, and the third length are different from each other.

8. The solid ion conductor of claim 1, wherein the compound has a unit cell comprising four $2_1$ screw axes along each unit cell direction and two planes in a direction perpendicular to each unit cell axis.

9. The solid ion conductor of claim 1, wherein in the crystal structure of the compound, $LuCl_6$ or $LiX_6$ octahedrons are positioned in an edge-sharing manner, wherein X is Cl or Br, and the A cation is positioned at a Li site.

10. The solid ion conductor of claim 1, wherein the compound has a three-dimensional network of lithium ion transport channels within the orthorhombic crystal structure.

11. The solid ion conductor of claim 1, wherein the compound has a network of lithium ion transport channels, which extend in an x-axis direction, a y-axis direction, and a z-axis direction, and
a spatial distribution of the lithium ion transport channels is determined by an ionic radius of the cation A or the monovalent anion X in the orthorhombic crystal structure.

12. The solid ion conductor of claim 1, wherein the compound has an X-ray diffraction spectrum comprising a diffraction peak at 29°2θ to 32°2θ, 33°2θ to 35°2θ, and 34°2θ to 37°2θ, when analyzed with CuKα radiation.

13. The solid ion conductor of claim 12, wherein the diffraction peaks of the compound are shifted to a smaller diffraction angle relative to diffraction peaks of $Li_3LuCl_6$.

14. The solid ion conductor of claim 1, wherein the solid ion conductor has an ionic conductivity of about $1\times 10^{-1}$ milliSiemens per centimeter to about $5\times 10^{-1}$ milliSiemens per centimeter, when measured at 25° C.

15. The solid ion conductor of claim 1, wherein the solid ion conductor has an interfacial resistance of about 1 ohm square centimeter to about 500 ohm square centimeters when contacted with lithium metal, when determined from an impedance spectrum of a lithium symmetric cell, in which the solid ion conductor is disposed between lithium metal electrodes, at 25° C., and a frequency range of 1 Hertz to $1\times 10^6$ Hertz.

16. A solid electrolyte comprising the solid ion conductor according claim 1.

17. A protected positive electrode comprising:
a positive electrode layer; and
a protection layer comprising the solid ion conductor of claim 1 on the positive electrode layer.

18. A protected negative electrode comprising:
a negative electrode layer; and
a protection layer comprising the solid ion conductor of claim 1 on the negative electrode layer.

19. An electrochemical device comprising:
a positive electrode layer;
a negative electrode layer; and
a solid electrolyte layer between the positive electrode layer and the negative electrode layer, wherein the positive electrode layer, the solid electrolyte layer, the negative electrode layer, or a combination thereof comprises the solid ion conductor according to claim 1.

20. The electrochemical device of claim 19, wherein the solid electrolyte layer comprises the solid ion conductor.

21. The electrochemical device of claim 19, further comprising a positive-electrode protection layer comprising the solid ion conductor on the positive electrode layer, a negative-electrode protection layer comprising the solid ion conductor on the negative electrode layer, or a combination thereof.

22. The electrochemical device of claim 20, wherein the solid electrolyte layer has a thickness of about 10 micrometers to about 1 millimeter, and has a single-layer structure or a multilayer structure.

23. The electrochemical device of claim 20, wherein the electrochemical device is an all-solid-state secondary battery or a metal air battery.

24. A method of preparing a solid ion conductor, the method comprising:
providing a precursor mixture; and
mechanically milling the precursor mixture to prepare the solid ion conductor,
wherein the solid ion conductor comprises a compound represented by Formula 1 having an orthorhombic crystal structure, and belonging to a Pnma space group or a Pnma-like space group:

$$Li_{3-x}A_xLuCl_{6-y}X_y \quad \text{Formula 1}$$

wherein, in Formula 1,
A is a monovalent cation having an ionic radius of 76 pm or more,
X is a monovalent anion, and
$0<x\leq0.1$, $0\leq y\leq1$, and $x+y>0$.

25. The method of claim 24, wherein the mechanical milling comprises ball milling, airjet milling, bead milling, roll milling, hand milling, planetary milling, stirred ball milling, vibrating milling, mechanofusion milling, shaker milling, attritor milling, disk milling, shape milling, nauta milling, high-shear mixing, or a combination thereof.

26. The method of claim 24, wherein the mechanical milling comprises planetary milling, and is performed at a temperature of about 25° C.

* * * * *